(12) United States Patent
Lu et al.

(10) Patent No.: US 8,918,346 B2
(45) Date of Patent: Dec. 23, 2014

(54) SYSTEM AND METHOD EMPLOYING A MINIMUM DISTANCE AND A LOAD FEATURE DATABASE TO IDENTIFY ELECTRIC LOAD TYPES OF DIFFERENT ELECTRIC LOADS

(75) Inventors: Bin Lu, Shanghai (CN); Yi Yang, Milwaukee, WI (US); Santosh K. Sharma, Maharashtra (IN); Prachi Zambare, Maharashtra (IN); Mayura A. Madane, Maharashtra (IN)

(73) Assignee: Eaton Corporation, Cleveland, OH (US)

( * ) Notice: Subject to any disclaimer, the term of this patent is extended or adjusted under 35 U.S.C. 154(b) by 266 days.

(21) Appl. No.: 13/304,834

(22) Filed: Nov. 28, 2011

(65) Prior Publication Data

US 2013/0138661 A1 May 30, 2013

(51) Int. Cl.
G06F 15/18 (2006.01)
G06E 1/02 (2006.01)
G06G 7/10 (2006.01)

(52) U.S. Cl.
USPC ............. 706/12; 706/20; 706/21; 706/22

(58) Field of Classification Search
CPC ............. G01R 31/086; G01R 31/318575; G01R 19/2513; G05B 23/02; G05B 23/024; G05B 23/0281
USPC ........................................... 706/12
See application file for complete search history.

(56) References Cited

U.S. PATENT DOCUMENTS

| 4,858,141 | A | 8/1989 | Hart et al. |
| 5,483,153 | A | 1/1996 | Leeb et al. |
| 5,717,325 | A | 2/1998 | Leeb et al. |
| 5,910,875 | A | 6/1999 | Tian et al. |

(Continued)

FOREIGN PATENT DOCUMENTS

| EP | 2 026 299 A1 | 2/2009 |
| GB | 2465367 A | 5/2010 |
| WO | 2010/005985 A1 | 1/2010 |
| WO | 2011/002735 A1 | 1/2011 |

OTHER PUBLICATIONS

Cole et al., Nonintrusive Identification of Electrical Loads in a Three-Phase Environment Based on Harmonic Content, 2000.*

(Continued)

Primary Examiner — Li-Wu Chang
Assistant Examiner — Nathan Brown, Jr.
(74) Attorney, Agent, or Firm — Eckert Seamans Cherin & Mellott, LLC; Kirk D. Houser; Philip E. Levy

(57) ABSTRACT

A method identifies electric load types of a plurality of different electric loads. The method includes providing a load feature database of a plurality of different electric load types, each of the different electric load types including a first load feature vector having at least four different load features; sensing a voltage signal and a current signal for each of the different electric loads; determining a second load feature vector comprising at least four different load features from the sensed voltage signal and the sensed current signal for a corresponding one of the different electric loads; and identifying by a processor one of the different electric load types by determining a minimum distance of the second load feature vector to the first load feature vector of the different electric load types of the load feature database.

16 Claims, 11 Drawing Sheets

(56) References Cited

U.S. PATENT DOCUMENTS

| | | | |
|---|---|---|---|
| 6,081,123 | A | 6/2000 | Kasbarian et al. |
| 7,268,989 | B2 | 9/2007 | Parker et al. |
| 7,362,552 | B2 | 4/2008 | Elms et al. |
| 2009/0072985 | A1 | 3/2009 | Patel et al. |

OTHER PUBLICATIONS

Lam et al., A Novel Method to Construct Taxonomy of Electrical Appliances Based on Load Signatures [online], 2007 [retrieved on Mar. 28, 2014]. Retrieved from Internet: <URL:http://www.google.com/url?q=http://ieeexplore.ieee.org/xpls/abs_all.jsp%3Farnumber%3D4266955&sa=U&ei=yOY5U43zLpStsAT_mIDIDw&ved=0CBsQFjAA&usg=AFQjCNG03SE9iHjf0TMQblqJp1TdTa_7S>.*

Energy Circle, "TED 5000 Series: The Energy Detective Electricity Monitor", http://www.energycircle.com/shop/ted-5000-g-with-google-power-meter.html, 2011, 5 pp.

Lam, H.Y., et al., "A Novel Method to Construct Taxonomy of Electrical Appliances Based on Load Signatures", IEEE Transactions on Consumer Electronics, vol. 53, No. 2, May 2007, p. 653-60.

Hart, G.W., "Nonintrusive Appliance Load Monitoring", Proceedings of the IEEE, vol. 80, Dec. 1992, pp. 1870-1891.

Drenker, S., et al., "Nonintrusive Monitoring of Electric Loads", IEEE Computer Applications in Power, vol. 12, No. 4, 1999, pp. 47-51.

Marceau, M.L., et al., "Nonintrusive load disaggregation computer program to estimate the energy consumption of major end uses in residential buildings", Energy Conversion and Management, vol. 41, 2000, pp. 1389-1403.

Cole, A., et al., "Nonintrusive Identification of Electrical Loads in a Three-Phase Environment Based on Harmonic Content", Proc. IEEE Instrumentation and Measurement Technology Conference, IMTC 2000, vol. 1, May 1-4, 2000, pp. 24-29.

Chan, W.L., et al., "Harmonics Load Signature Recognition by Wavelets Transforms", Proc. International Conference on Electric Utility Deregulation and Restructuring and Power Technologies, DRPT 2000, Apr. 4-7, 2000, pp. 666-671.

Shaw, S.R., et al., "Nonintrusive Load Monitoring and Diagnostics in Power Systems", IEEE Transactions on Instrumentation and Measurement, vol. 57, No. 7, Jul. 2008, pp. 1445-1454.

Kohonen, T., "Self-Organizing Maps", Third Edition: Springer, 2001, ISBN: 3-540-67921-9, pp. i-ii; 104-37.

Chesnut, C., "Self Organizing Map AI for Pictures", http://www.generation5.org/content/2004/aiSomPic.asp, 2004, 16 pp.

Mahalanobis, P.C., "On the Generalized Distance in Statistics", Proceedings of the National Institute of Sciences of India, vol. II—No. 1, 1936, pp. 49-55.

Theodoridis, S., et al., "Pattern Recognition", Fourth Ed., Academic Press, 2009, ISBN: 978-1-59749-2720, pp. i-iii; 20-39 and 58-61.

Wikipedia Foundation, Inc., "Self-organizing map", http://en.wikipedia.org/wiki/Self-organizing_map, Oct. 6, 2011, 7 pp.

M. Zeifman et al., "Nonintrusive Appliance Load Monitoring: Review and Outlook", IEEE Transactions on Consumer Electronics, vol. 57, No. 1, Feb. 21, 2011, pp. 76-84.

Y. Du et al., "A Review of Identification and Monitoring Methods for Electric Loads in Commercial and Residential Buildings", Proceedings of the 2010 IEEE Energy Conversion Congress and Exposition, Sep. 12, 2010, pp. 4527-4533.

F. Kupzog et al., "Automatic Electric Load Identification in Self-Configuring Microgrids", Proceedings of the 9th IEEE Africon Conference, Sep. 23, 2009, 5 pp.

S. Chen et al., "Implementation of a Virtual-Instrument for Nonintrusive Intelligent Real-Time Load Monitoring", Proceedings of the lasted International Conference on Neural Networks and Computational Intelligence, 2003, pp. 174-178.

European Patent Office, "International Search Report and Written Opinion", Oct. 18, 2013, 12 pp.

\* cited by examiner

4

| LAYER 1 - LOAD CATEGORY | LAYER 2 - LOAD SUB-CATEGORY | LAYER 3 - LOAD TYPE |
|---|---|---|
| R: RESISTIVE LOADS | R1: LIGHTING TOOLS | INCANDESCENT LAMPS (<100 W) |
|  | R2: KITCHEN APPLIANCES/PERSONAL CARE APPLIANCES | BREAD TOASTER<br>SPACE HEATER<br>APPLIANCES |
| X: REACTIVE LOADS | X1: LINEAR REACTIVE LOADS | FANS |
|  | X2: NONLINEAR WITH MACHINE SATURATIONS | VENDING MACHINE<br>SHREDDER<br>REFRIGERATOR (WITH CHILLER) |
| P: NONLINEAR W/ PFC | P1: LARGE MONITORS/TVs EQUIPMENT | BIG TVs/MONITORS (LCD/LED) (>75 W) |
|  | P2: OTHER LARGE CONSUMER ELECTRONIC DEVICES | PC (DESKTOP/LAPTOP) (>75 W)<br>PROJECTORS<br>HOME THEATER/GAME CONSOLES (70 W-80 W) |
| NP: NONLINEAR W/O PFC | NP1: IMAGING EQUIPMENT | PORTABLE MFD/PRINTER/SCANNER |
|  | NP2: SMALL MONITORS/TVs | PC MONITORS/TVs |
|  | NP3: PCs | PC (DESK/LAPTOP) (< 75 W) |
|  | NP4: ELECTRONIC LOADS WITH BATTERY CHARGER | CELLPHONE/PDA CHARGERS |
|  | NP5: LIGHTING LOADS | FL/CFL |
|  | NP6: OTHER SMALL ELECTRONIC DEVICES | DVD PLAYER; SET TOP BOX |
| T: NONLINEAR W/ TXM | T1: SMALL ELECTRONICS W/O BATTERY CHARGER | STAPLERS<br>COMPUTER SPEAKERS |
|  | T2: W/ BATTERY CHARGER | AA BATTERY CHARGER |
| PAC: NONLINEAR W/ PHASE ANGLE CONTROL |  | LIGHTING LOADS WITH DIMMER |
|  |  | SPACE HEATERS/FANS WITH PHASE ANGLE CONTROLLED RECTIFIER |
| M: COMPLEX STRUCTURE | M1: MICROWAVE OVEN | MICROWAVE OVEN |
|  | M2: R + NP | MFD/PRINTER/COPIER/FAX MACHINES |
|  | M3: PAC + NP | MFD/PRINTER/COPIER/FAX MACHINES |

FIG.2

SYSTEM AND METHOD EMPLOYING A MINIMUM DISTANCE AND A LOAD FEATURE DATABASE TO IDENTIFY ELECTRIC LOAD TYPES OF DIFFERENT ELECTRIC LOADS

This invention was made with Government support under DE-EE0003911 awarded by the Department of Energy National Energy Technology Laboratory. The Government has certain rights in this invention.

CROSS-REFERENCE TO RELATED APPLICATIONS

This application is related to commonly assigned, copending U.S. patent application Ser. No. 13/304,783, filed Nov. 28, 2011, entitled "System And Method Employing A Hierarchical Load Feature Database To Identify Electric Load Types Of Different Electric Loads"; and U.S. patent application Ser. No. 13/304,758, filed Nov. 28, 2011, entitled "System And Method Employing A Self-Organizing Map Load Feature Database To Identify Electric Load Types Of Different Electric Loads".

BACKGROUND

1. Field

The disclosed concept pertains generally to electric loads and, more particularly, to methods of identifying electric load types of electric loads. The disclosed concept also pertains to systems for identifying electric load types of electric loads.

2. Background Information

Electricity usage costs have become an increasing fraction of the total cost of ownership for commercial buildings. At the same time, miscellaneous electric loads (MELs) account for about 36% of electricity consumption of commercial buildings. Effective management of MELs could potentially improve energy savings of buildings up to about 10%. However, power consumption monitoring and energy management of MELs inside commercial buildings is often overlooked. In order to provide the MELs' energy consumption conditions by load type to a building automation system (BAS), and, consequently, to manage the MELs and reduce energy consumption inside commercial buildings, there is a need to identify the MELs.

Lam, H. Y. et al., "A novel method to construct taxonomy of electrical appliances based on load signatures," IEEE Transactions on Consumer Electronics, vol. 53, no. 2, 2007, p. 653-60, discloses that a load signature is an electrical expression that a load device or appliance distinctly possesses. Load signatures can be applied to produce many useful services and products, such as, determining the energy usage of individual appliances, monitoring the health of critical equipment, monitoring power quality, and developing facility management tools. Load signatures of typical yet extensive loads are needed to be collected before applying them to different services and products. As there are an enormous number of electrical appliances, it is beneficial to classify the appliances for building a well-organized load signature database. A method to classify the loads employs a two-dimensional form of load signatures, voltage-current (V-I) trajectory, for characterizing typical household appliances. A hierarchical clustering method uses a hierarchical decision tree or dendrogram to show how objects are related to each other. Groups of the objects can be determined from the dendrogram, to classify appliances and construct the taxonomy of the appliances. The taxonomy based on V-I trajectory is compared to the taxonomies based on traditional power metrics and eigenvectors in prior studies.

In this taxonomy approach, only one set of load features is utilized, and the hierarchical structure of appliances, a dendrogram, is based on the selection of a distance value/threshold between the groups in each level, or the height of a cluster tree. In this approach, the selection of the distance/height will affect how the hierarchical tree is built.

The power usage monitoring of MELs by types in residential, commercial or industrial buildings provides an opportunity to effectively manage MELs and potentially improve energy savings of buildings. This needs an accurate and unambiguous identification of MELs that are plugged into, for example, power outlets.

To successfully identify MELs, the biggest challenge is to distinguish the loads with the most similarity, for example and without limitation, a DVD, a set top box, and a PC monitor (e.g., those using a standardized DC power supply, and current harmonic reduction techniques). This difficulty has not been explicitly addressed and solved by known techniques.

Today, a majority of MELs connected to a building remain unidentified due to the lack of intelligence of building management systems or BASs. The operational status and energy consumption of loads needs to be communicated to a building management system or BAS in an automatic, low cost and non-intrusive manner. The electric loads often present unique characteristics in their electric signals (e.g., voltage, current and power). Such load characteristics provide a viable means to identify the type of the load (e.g., without limitation, PC; heater; lamp) and its operational status (e.g., without limitation, active; ready; standby) by analyzing the unique characteristics of the corresponding electric signals (e.g., voltage, current and power of plugged loads at a power outlet or intelligent receptacle).

Known proposals for detecting single-phase electric loads are based on voltage, current and/or power measurements, including, relative position in active-reactive power plane (P-Q plane); variation in active and reactive power at different operating conditions; harmonic power contents and harmonic currents; steady-state two-dimensional voltage-current (V-I) trajectories; instantaneous power; instantaneous admittance; and power factor.

Prior proposals employ a variation in active and reactive power at different operating conditions as an indication of the characteristics of the load, obtained from continuous measurement of current and voltage. Subsequent identification is then made by comparing active and reactive power values with a library of known characteristics of typical loads. These methods are extended by including harmonic power contents and harmonic currents as additional features.

A recent prior proposal considers the use of steady-state two-dimensional voltage-current trajectories to identify and classify electric loads. The measured voltage and current time series in one power line cycle are plotted on a V-I plane 100 as shown in FIG. 7. The different features of the shape are used to characterize different loads, such as resistive, inductive, and rectifier types. The shape signature includes features, such as asymmetry, area, curvature of mean line 101, slope of middle segment, area of left and right segment, and peak height of middle segment. These signatures are used to cluster and identify loads.

Another prior proposal uses transient signatures for load classification and identification.

However, it is believed that these proposals suffer from several serious disadvantages in their accuracy, robustness and applicability, including: (1) MELs with different voltage and current characteristics may be grouped together by the identifier if they consume approximately the same amount of active and reactive power; (2) MELs of the same type may be grouped separately by the identifier if they have different power ratings; (3) steady-state operation is usually required for load detection, while many building loads are dynamic in nature; and (4) MELs with similar current features cannot be distinguished, such as DVD players and set top boxes (e.g., MELs with same type of DC power supply). These disadvantages together with the lack of an intelligent power outlet/strip capable of acquiring signals and processing algorithms have impeded the applications of these methods in the real world.

There is room for improvement in methods of identifying electric load types of electric loads.

There is further room for improvement in systems for identifying electric load types of electric loads.

SUMMARY

These needs and others are met by embodiments of the disclosed concept, which identify one of a plurality of different electric load types by determining a minimum distance of a multi-dimensional load feature vector to a multi-dimensional load feature vector of a plurality of different electric load types of a load feature database.

In accordance with one aspect of the disclosed concept, a method of identifying electric load types of a plurality of different electric loads comprises: providing a load feature database of a plurality of different electric load types, each of the different electric load types including a first load feature vector having at least four different load features; sensing a voltage signal and a current signal for each of the different electric loads; determining a second load feature vector comprising at least four different load features from the sensed voltage signal and the sensed current signal for a corresponding one of the different electric loads; and identifying by a processor one of the different electric load types by determining a minimum distance of the second load feature vector to the first load feature vector of the different electric load types of the load feature database.

The method may comprise employing i and k as indices; employing K as a count of records in the load feature database as indexed by k; employing δ as a constant value; employing $D_{ik}$ as distance between the second load feature vector and the first load feature vector and as a $k^{th}$ record in the load feature database; and determining probability of the corresponding one of the different electric loads being the $i^{th}$ one of the different electric load types of the load feature database from:

$$Pm_i = \max\left[\left(\frac{1}{\delta + D_{ik}}\right)_{k=1,\ldots,K}\right].$$

The method may employ I as a count of the different electric load types in the load feature database; and determine likelihood of the corresponding one of the different electric loads being the $i^{th}$ one of the different electric load types from:

$$L_i = \frac{Pm_i}{\sum_{i=1}^{I} Pm_i}$$

The method may include with the different electric load types a category of an electrical load, a type of the electrical load, and an operational state of the electrical load.

The method may calculate distances for each of the at least four different load features between the second load feature vector of the corresponding one of the different electric loads and the first load feature vector of each of the different electric load types in the load feature database; for each of the different electric load types, sum the calculated distances for the corresponding one of the different electric loads; identify the one of the different electric load types from a minimum value of the summed calculated distances for each of the different electric load types; and identify how likely the corresponding one of the different electric loads is the one of the different electric load types.

The method may calculate the distances selected from the group consisting of squared Euclidean distances, Canberra distances, and Mahalanobis distances.

The method may employ a weighting value for a corresponding one of the different load features of the first and second load feature vectors in association with each of the calculated distances.

As another aspect of the disclosed concept, a system comprises: a load feature database of a plurality of different electric load types, each of the different load types including a first load feature vector having at least four different load features; a plurality of sensors structured to sense a voltage signal and a current signal for each of a plurality of different electric loads; and a processor structured to: determine a second load feature vector comprising at least four different load features from the sensed voltage signal and the sensed current signal for a corresponding one of the different electric loads, and identify one of the different electric load types by determining a minimum distance of the second load feature vector to the first load feature vector of the different electric load types of the load feature database.

BRIEF DESCRIPTION OF THE DRAWINGS

A full understanding of the disclosed concept can be gained from the following description of the preferred embodiments when read in conjunction with the accompanying drawings in which:

FIG. 2 is a representation of a hierarchical load feature database of FIG. 1.

FIG. 9 is a plot of current versus time representing a transient current when a fan is turned on.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with example loads and example load features, although the disclosed concept is applicable to a wide range of loads and a wide range of load features.

The disclosed concept provides a method and system to identify electric load types, load operating modes and/or load health, by utilizing voltage and current signals of loads and suitable data processing and/or pattern recognition processes. This enables a wide range of MELs' identification technologies and MELs energy management applications.

Figure 1:
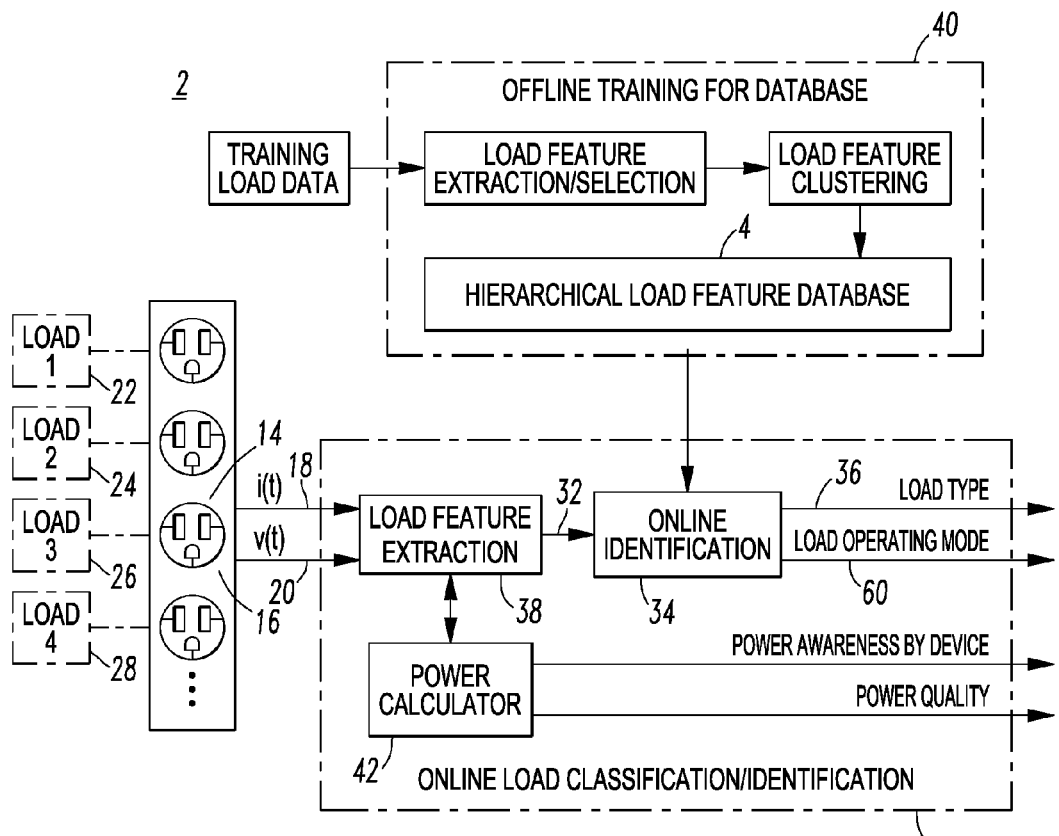
FIG. 1 is a block diagram of a system to identify miscellaneous electric loads (MELs) in accordance with embodiments of the disclosed concept.

Referring to FIG. 1, an example MELs identification system 2 is shown. The system 2 includes a hierarchical load feature database 4 comprising a plurality of layers (non-limiting examples of which are shown in FIG. 2 as layers 6,8,10, it being appreciated that more than three layers can be employed). One of the example layers 10 of FIG. 2 includes a plurality of different example electric load types 12. A plurality of sensors, such as the example current sensor 14 and the example voltage sensor 16 for one load, are structured to sense a current signal (i(t)) 18 and a voltage signal (v(t)) 20 for each of a plurality of different electric loads (four different example loads 22,24,26,28 are shown in phantom line drawing, it being appreciated that any number of loads can be employed).

The system 2 also includes a processor 30 structured to determine at least four different load features 32 from the sensed voltage signal 20 and the sensed current signal 18 for a corresponding one of the different electric loads (e.g., example load 26, as shown), and identify (at the example online identification process 34) a load type 36 of the different electric load types 12 by relating the different load features 32 to the hierarchical load feature database 4.

As will be explained, each of a plurality of the layers 6,8,10 of FIG. 2 includes a corresponding load feature set, and the corresponding load feature set of at least one of the layers 6,8,10 (e.g., without limitation, layer 6) is different from the corresponding load feature set of at least another one of the layers 6,8,10 (e.g., without limitation, layer 8 or layer 10).

The example system 2 includes the electrical sensors 14,16 coupled to a power circuit (e.g., to sense voltage, current and power of plugged loads, such as example loads 22,24,26,28, at a power outlet, intelligent receptacle, panelboard or load center, it being appreciated that a wide range of different power circuits can be employed). A load feature extractor 38 acquires load electrical signatures in the form of a relatively high-dimensional feature vector, which in this example is the at least four different load features 32. The hierarchical load feature database 4, which is preferably scalable, is obtained from an offline training process 40. The online identification process 34 identifies the electric load type 36 by relating the high-dimensional feature vector to the hierarchical load feature database 4.

Any suitable processor (e.g., without limitation, a processor of a receptacle; a processor of a power strip; a processor of a panelboard or load center; a processor of a building or energy management system; a networked processor) runs the example offline training process 40 for the hierarchical load feature database 4.

Any suitable processor (e.g., without limitation, a processor of a receptacle; a processor of a power strip; a processor of a panelboard or load center; a processor of a building or energy management system; a networked processor) runs the example online load classification/identification process 34.

The processor 30 can include an optional power calculator 42 used to calculate power related quantities (e.g., without limitation, load current RMS values; real power consumption; power factor). The power calculator 42 provides continuous power monitoring for various loads of interest, and also facilitates load feature extraction when load identification is needed.

Example features for the example first layer 6 of the hierarchical load feature database 4 of FIG. 2 include: true power factor (PF) (e.g., ratio of the real power flowing to a load to the apparent power in the power circuit; a dimensionless number between 0 and 1 (or a percentage, e.g., 0.5 PF=50% PF)), displacement power factor (e.g., in linear circuits having only sinusoidal currents and voltages of one frequency, the power factor arises only from the difference in phase between the current and voltage), current total harmonic distortion (THD), normalized admittance, and V-I trajectory graphical representations (e.g., without limitation, area; number of segments; polynomial coefficients) as are discussed in detail, below.

Example features for example second layer 8 of the hierarchical load feature database 4 of FIG. 2 include: appliances power (or nominal power), distortion power factor, current THD, V-I trajectory graphical representations (e.g., without limitation, polynomial coefficients, thinness ratio), normalized third and fifth harmonics of voltage and current, and high-frequency components of voltage and current signals.

The distortion power factor (I1,rms/Irms) describes how the harmonic distortion of a load current decreases the average power transferred to the load. THDi is the total harmonic distortion of the load current. This assumes that the voltage stays undistorted (i.e., sinusoidal, without harmonics). This simplification is often a good approximation in practice. I1,rms is the fundamental component of the current and Irms is the total current, both of which are root mean square values.

The distortion power factor when multiplied by the displacement power factor is the overall, true power factor or just power factor (PF).

Example features for the example third layer 12 of the hierarchical load feature database 4 of FIG. 2 include: transient on/off behavior (e.g., without limitation, short-term harmonic contents; transient energy content), event detection (e.g., load turn on/off behaviors; load power fluctuation), and long-term operating mode patterns (e.g., without limitation, operating current/power profile of loads).

Another example load feature, K-factor, is linked with harmonic content of current, and represents a heating effect due to distorted current (e.g., for a supply transformer). K-factor is defined by Equation 1.

$$K\text{-factor} = (I_1^2 + (I_2 * 2)^2 + (I_3 * 3)^2 + \ldots (I_n * n)^2) / (I_1^2 + I_2^2 + I_3^2 + \ldots I_n^2) \quad \text{(Eq. 1)}$$

wherein:

$I_1$, $I_2$ and $I_3$ are first, second and third order current harmonics, respectively; and $I_n$ is the nth order current harmonic.

As the harmonic content of total $I_{rms}$ approaches zero, K-factor approaches one.

An example load feature, Area, refers to the area enclosed by a V-I trajectory. Area is proportional to the magnitude of the phase shift between the voltage and the current. If current leads voltage, then Area has a positive sign. If current lags voltage, then Area becomes negative. Area is directly calculated from the coordinates of the voltage and current points, $(x_i, y_i)$, on the V-I trajectory. The area, A, is given by Equation 2.

$$A = \frac{1}{2} \sum_{i=0}^{N-1} (x_i y_{i+1} - x_{i+1} y_i) \qquad \text{(Eq. 2)}$$

wherein:

N is the integer number of samples;

$x_i$ is a sample of voltage instantaneous value; and $y_i$ is a sample of current instantaneous value.

Figure 3:
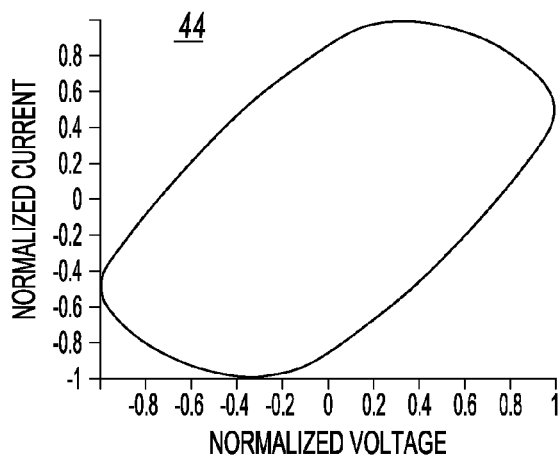
FIG. 3 is a plot of a voltage-current (V-I) trajectory of a portable fan.

FIG. 3 shows an example V-I trajectory 44 of a portable fan. Here, the calculated Area value is 2.4.

Another example load feature eccentricity, E, is the measure of the aspect ratio of a shape, and is the ratio of the length of the major axis to the length of the minor axis. This feature helps to identify the shape of the waveform. Eccentricity is calculated from Equations 3-5.

Equation 3 provides the covariance matrix, C, of the shape.

$$C = \frac{1}{N} \sum_{i=0}^{N-1} \begin{pmatrix} x_i - g_x \\ y_i - g_y \end{pmatrix} \begin{pmatrix} x_i - g_x \\ y_i - g_y \end{pmatrix}^T = \begin{pmatrix} c_{xx} & c_{xy} \\ c_{yx} & c_{yy} \end{pmatrix} \qquad \text{(Eq. 3)}$$

wherein:

N is the integer number of samples;

$x_i$ is a sample of voltage instantaneous value;

$y_i$ is a sample of current instantaneous value;

T in Equation 3 is the matrix transpose operator;

$(g_x, g_y)$ is the centroid of the V-I trajectory; and $$c_{xx} = \frac{1}{N} \sum_{i=0}^{N-1} (x_i - g_x)^2$$

$$c_{xy} = \frac{1}{N} \sum_{i=0}^{N-1} (x_i - g_x)(y_i - g_y)$$

$$c_{yx} = \frac{1}{N} \sum_{i=0}^{N-1} (y_i - g_y)(x_i - g_x)$$

$$c_{yy} = \frac{1}{N} \sum_{i=0}^{N-1} (y_i - g_y)^2$$

Equation 4 calculates the lengths of the two principle axes, $\lambda_1$ and $\lambda_2$.

$$\lambda_1 = \frac{1}{2} \left[ c_{xx} + c_{yy} + \sqrt{(c_{xx} + c_{yy})^2 + 4(c_{xx} c_{yy} - c_{xy}^2)} \right] \qquad \text{(Eq. 4)}$$

$$\lambda_2 = \frac{1}{2} \left[ c_{xx} + c_{yy} - \sqrt{(c_{xx} + c_{yy})^2 - 4(c_{xx} c_{yy} - c_{xy}^2)} \right]$$

Equation 5 calculates eccentricity, E.

$$E = \lambda_2 / \lambda_1 \qquad \text{(Eq. 5)}$$

For example, for the portable fan V-I trajectory 44 of FIG. 3, the eccentricity value, E, is calculated to be 0.28.

Another example load feature thinness, T, is defined by Equation 6.

$$T = 4\pi A / P^2 \qquad \text{(Eq. 6)}$$

wherein:

A is area of a shape; and

P is perimeter of the shape.

Example features defined by polynomial coefficients are established by polynomial curve fitting, which finds the coefficients of a normalized voltage of degree n that fits the normalized voltage to normalized current. Table 1 includes two examples of V-I trajectories 46,48 (as shown in FIGS. 4 and 5) in which their third order polynomial coefficients show distinct results.

TABLE 1

Figure 4:
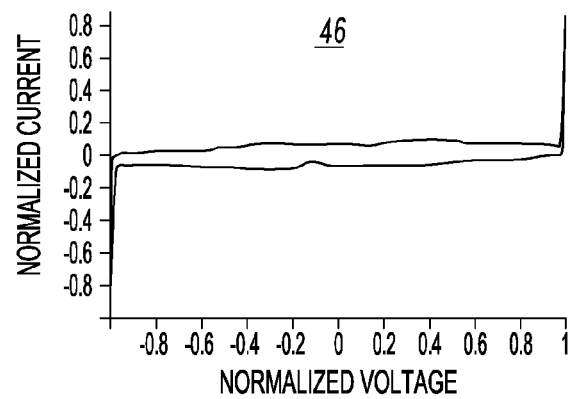
FIG. 4 is a plot of a V-I trajectory of a printer.
Figure 5:
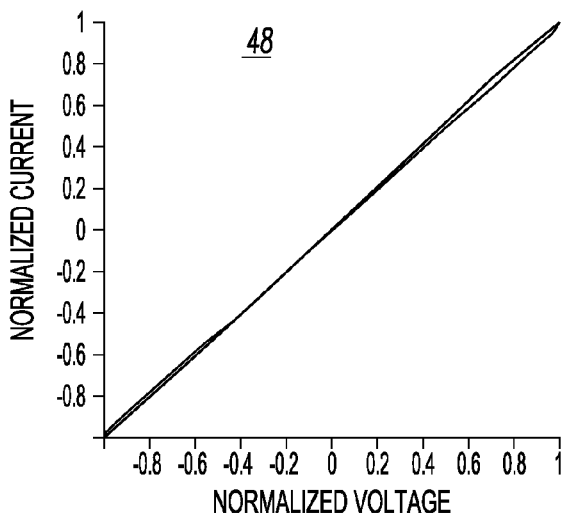
FIG. 5 is a plot of a V-I trajectory of an incandescent lamp.
Figure 6A:
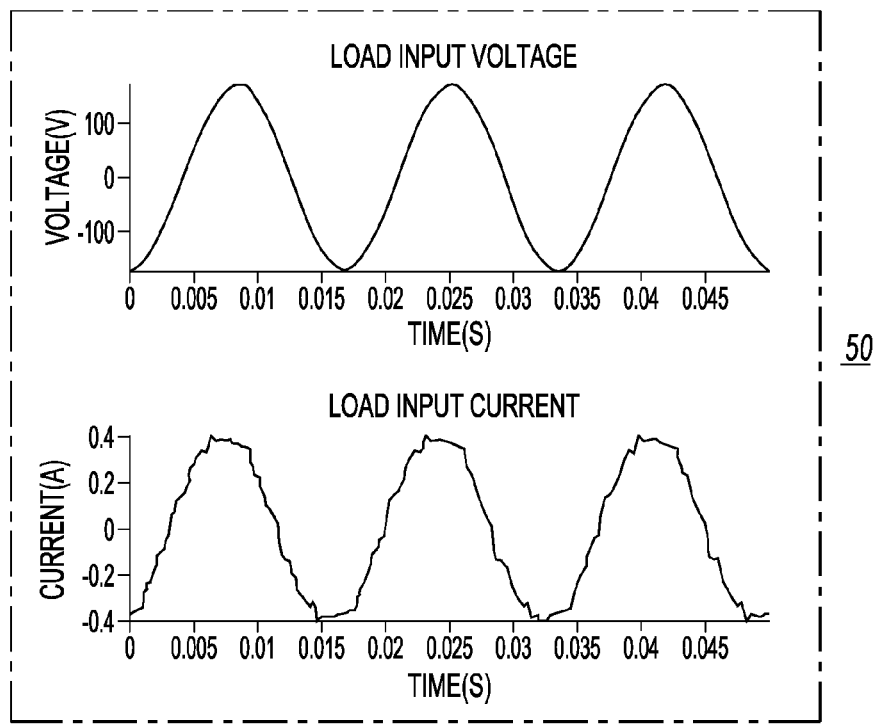
FIGS. 6A-6E are plots of measured voltage and current waveforms versus time for a portable fan, a shredder, a DVD player, a battery charger, and a set top box, respectively.
Figure 6B:
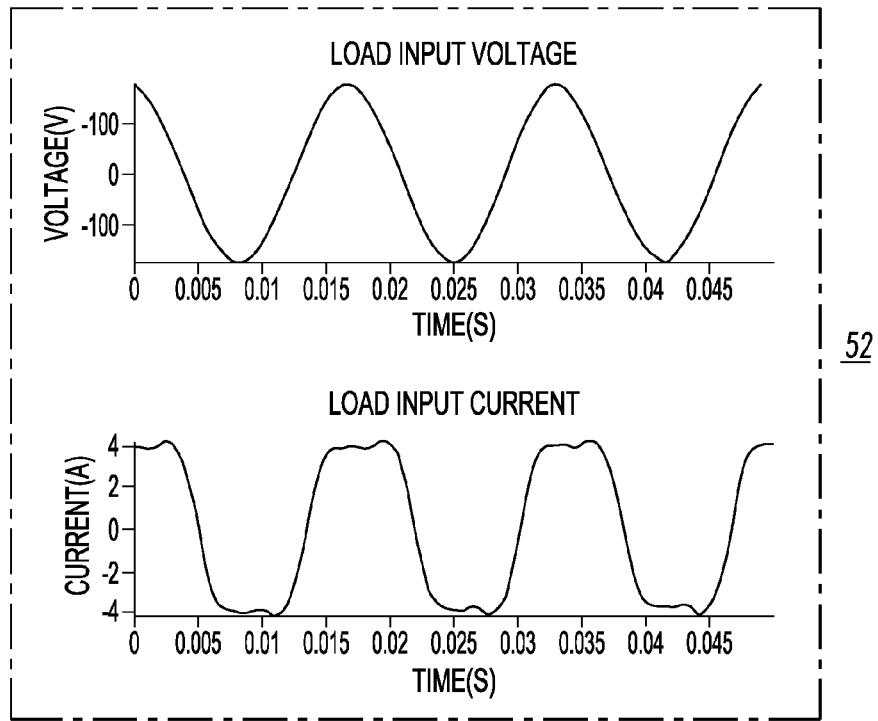
Figure 6C:
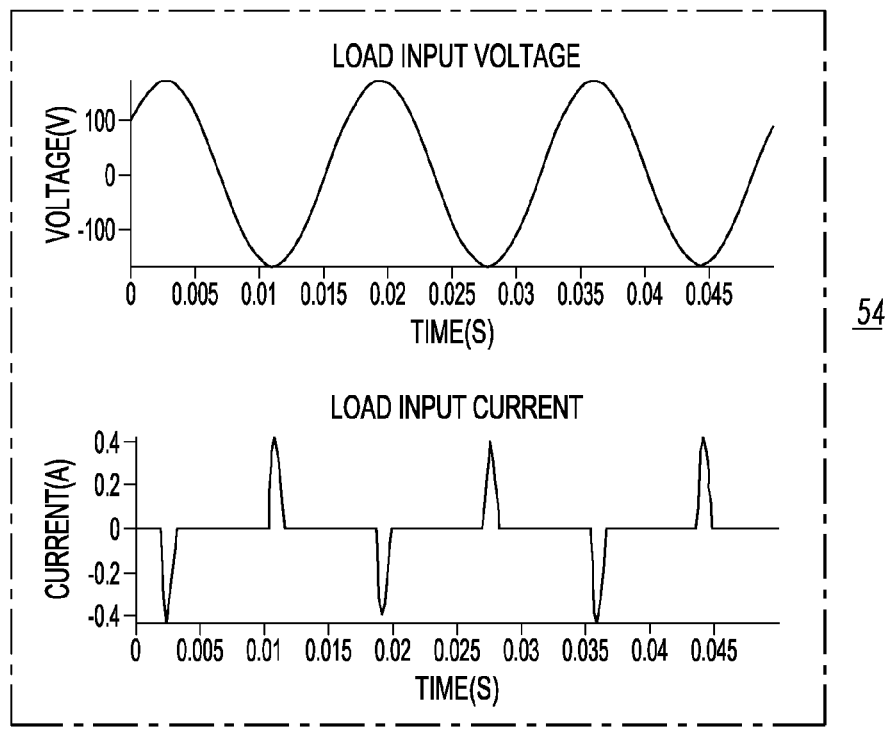
Figure 6D:
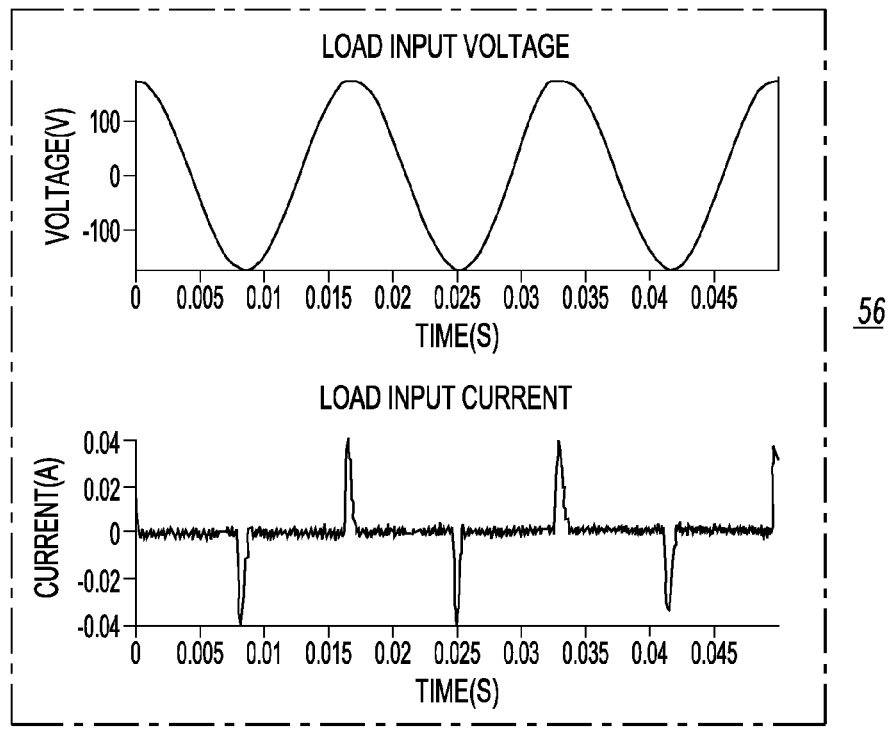
Figure 6E:
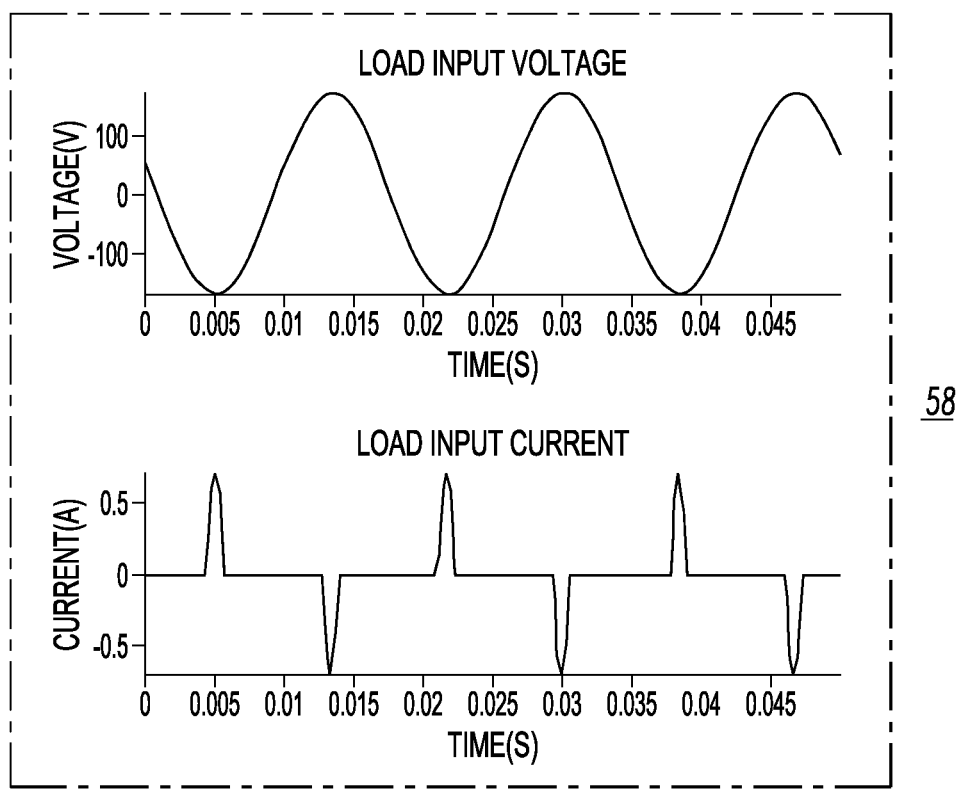
Figure 7:
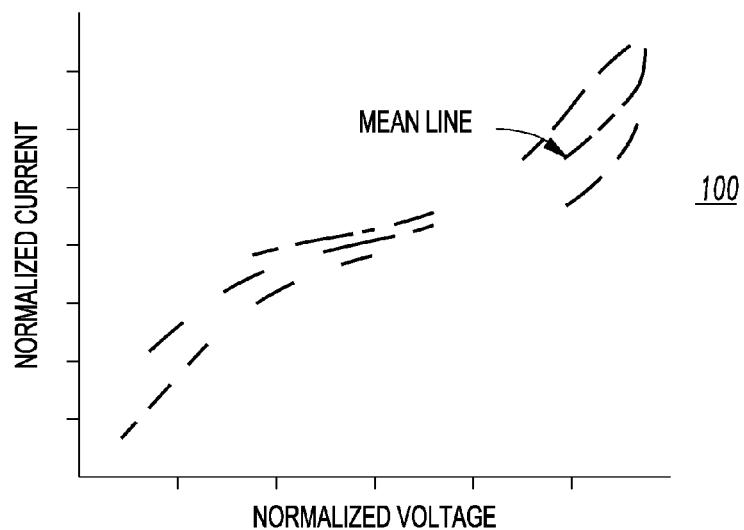
FIG. 7 is a plot of measured voltage versus current time series in one cycle.

| Type of load | V-I Trajectory | Third Order Polynomial Coefficients | | | |
|---|---|---|---|---|---|
| | | A | B | C | D |
| Printer | Figure 4 | 0.5575 | 0.0921 | −0.1846 | −0.0473 |
| Incandescent lamp | Figure 5 | −0.0730 | 0.0202 | 1.0673 | −0.0229 |

Tables 2-4 show examples of high-dimensional features that are selected for the example first layer 6 load category, as well as for the example layers 8,10 load sub-category/load type. The load feature ranges for each load category and sub-category are also given in Tables 2-4. Table 2 is an example of the selected load category feature ranges for the first layer 6 and includes minimum and maximum values of the four polynomial coefficients A-D and admittance. Table 3 is an example of the selected load category feature ranges for the X category of Table 2 for layers 8,10 and includes thinness and admittance. Table 4 is an example of the selected load category feature ranges for the NP category of Table 2 for layers 8,10 and includes minimum and maximum values of the four polynomial coefficients A-D, admittance, and P/Q ratio (i.e., the ratio between real power and reactive power).

TABLE 2

| Layer 1 Load Category | Poly Coeff. A | | Poly Coeff. B | | Poly Coeff. C | | Poly Coeff. D | | Admittance (Mho) | |
|---|---|---|---|---|---|---|---|---|---|---|
| | Min | Max | Min | Max | Min | Max | Min | Max | Min | Max |
| NP: | −0.746 | 0.994 | −0.079 | 0.164 | −0.443 | 0.164 | −0.085 | 0.016 | 0.000 | 0.023 |
| X: | −0.278 | 0.218 | −0.031 | 0.130 | 0.094 | 1.088 | −0.037 | 0.051 | 0.002 | 0.123 |
| P: | −0.770 | 0.984 | −0.145 | 0.172 | −0.430 | 1.656 | −0.078 | 0.044 | 0.000 | 0.036 |

TABLE 2-continued

| Layer 1 Load Category | Poly Coeff. A | | Poly Coeff. B | | Poly Coeff. C | | Poly Coeff. D | | Admittance (Mho) | |
|---|---|---|---|---|---|---|---|---|---|---|
| | Min | Max | Min | Max | Min | Max | Min | Max | Min | Max |
| M: | −0.230 | 0.784 | −0.046 | 0.143 | 0.113 | 0.940 | −0.077 | 0.027 | 0.001 | 0.124 |
| R: | −0.634 | 0.156 | 0.004 | 0.058 | 0.847 | 1.098 | −0.036 | 0.021 | 0.002 | 0.126 |

TABLE 3

| X-Category | Thinness | | Admittance (Mho) | |
|---|---|---|---|---|
| | Min | Max | Min | Max |
| Fan | −7.366E−05 | 1.169E−02 | 3.520E−05 | 1.581E−02 |
| Shredder | 6.393E−03 | 8.344E−03 | 2.729E−02 | 3.065E−02 |

TABLE 4

| NP - Category | Poly Coeff. A | | Poly Coeff. B | | Poly Coeff. C | |
|---|---|---|---|---|---|---|
| | Min | Max | Min | Max | Min | Max |
| DVD Player | −7.78E−01 | 8.35E−01 | −1.74E−02 | 2.70E−01 | −3.91E−01 | 1.64E+00 |
| Set Top Box | 5.47E−01 | 9.71E−01 | −4.43E−03 | 2.35E−02 | −4.47E−01 | −2.36E−01 |
| Battery Charger | −3.23E−01 | 5.64E−01 | −2.01E−01 | 2.28E−01 | −1.40E−01 | 3.60E−01 |

| NP - Category | Poly Coeff. D | | Admittance (Mho) | | P/Q Ratio | |
|---|---|---|---|---|---|---|
| | Min | Max | Min | Max | Min | Max |
| DVD Player | −1.17E−01 | 6.63E−03 | 1.39E−04 | 7.97E−03 | 1.16E−01 | 4.32E+00 |
| Set Top Box | −1.21E−02 | −1.43E−03 | 9.64E−04 | 4.94E−03 | 2.54E−01 | 4.38E−01 |
| Battery Charger | −1.33E−01 | 6.88E−02 | 1.25E−04 | 2.86E−04 | 6.58E−02 | 1.81E−01 |

TABLE 5

| X - Category | Thinness | Admittance | Coeff. A | Coeff. B | Coeff. C | Coeff. D |
|---|---|---|---|---|---|---|
| Fan | −7.34E−05 | 2.27E−03 | 8.07E−03 | 4.99E−03 | 9.08E−01 | −3.90E−03 |
| Shredder | 8.94E−03 | 2.70E−02 | −1.83E−01 | 2.30E−02 | 1.11E+00 | 1.09E−02 |

TABLE 6

| NP - Category | Coeff. A | Coeff. B | Coeff. C | Coeff. D | Admittance | P/Q Ratio |
|---|---|---|---|---|---|---|
| DVD Player | 3.38E−01 | 1.45E−02 | −1.59E−01 | −1.19E−02 | 1.39E−04 | 1.16E−01 |
| Set Top Box | 6.76E−01 | 1.01E−02 | −3.14E−01 | −8.76E−03 | 1.44E−03 | 2.74E−01 |
| Battery Charger | 5.64E−01 | 5.93E−02 | −1.40E−01 | −5.37E−02 | 1.32E−04 | 8.18E−02 |

The disclosed concept employs a proximity algorithm based MELs classifier and/or identifier. The load feature database 4 (FIG. 2) is constructed with the reference load types 12, which are uniquely represented by load feature vectors in a suitable multi-dimensional space. As will be discussed, for a test load, the proximity algorithm calculates a spatial distance of a test load feature vector from a load feature vector in the database 4 to provide a test load type, and also may provide a likelihood estimation of the test load type (e.g., identify how likely the test load belongs to one of the load types 12 in the database 4).

The disclosed concept: (1) structures a suitable multi-dimensional load feature space of MELs (e.g., the example database 4), in order that a suitable multi-dimensional load feature vector of each load (extracted from measured current/voltage signals of each load, such as 22,24,26,28 (FIG. 1)) is employed to distinguish itself from other loads; and (2) employs the proximity algorithm for load identification. The suitable multi-dimensional load feature vector of MELs can employ the following example factors of the load current that are important to characterize each type of electronic/electric load commonly used for residential, commercial and industrial applications: (1) start-up transient and load profile; (2) steady state current waveform; (3) transient current; and (4) the voltage-current (V-I) trajectory under start-up and steady-state conditions.

Figure 8:
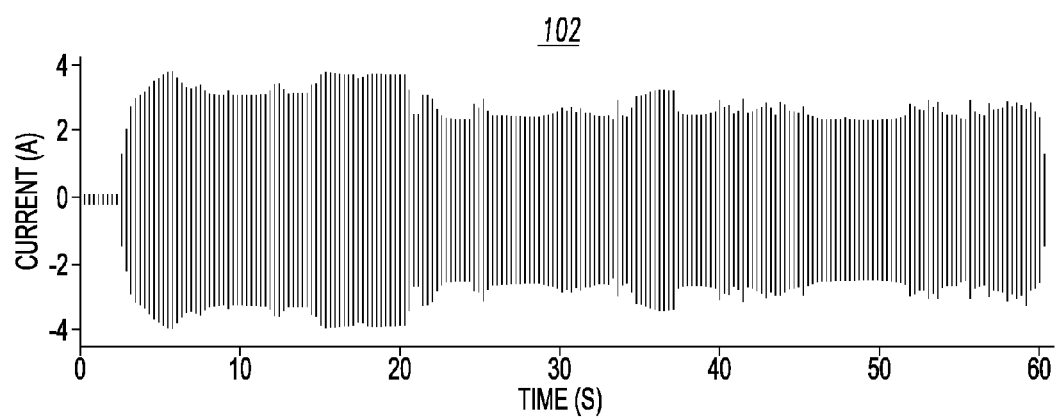
FIG. 8 is a plot of current versus time representing a typical start-up load profile of a particular personal computer.

Start-up transient and load profile refers to the power profile/pattern of an electric load when it is starting up (i.e., after it turns on, but before it reaches its stable operating mode). This start-up transient happens to loads, especially those with multiple components (e.g., without limitation, personal computers; televisions; printers; DVD players). During start-up, the different components inside the load need to be initialized to proper states before the load is fully functional. FIG. 8 shows an example start-up load profile 102 of a particular personal computer for which the start-up period lasts for about 20 to 30 seconds.

Figure 9:
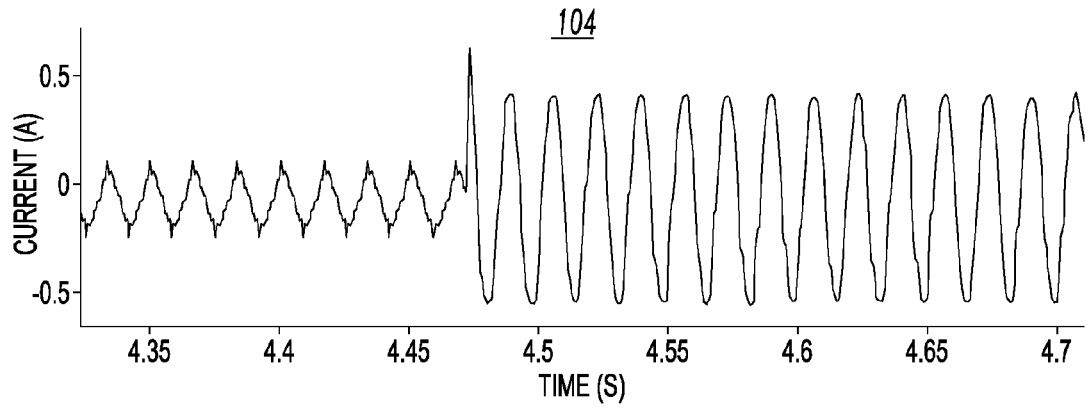

Transient current is an oscillatory or aperiodic current that flows in a power circuit for a relatively short time following an electromagnetic disturbance. Example causes of transient current are a nearby strike of lighting, or the application or removal of power from a circuit (e.g., because of expanding or collapsing magnetic fields in inductors, or charging or discharging of capacitors). FIG. 9 shows an example of transient current 104 when a fan is turned on.

Figure 10:
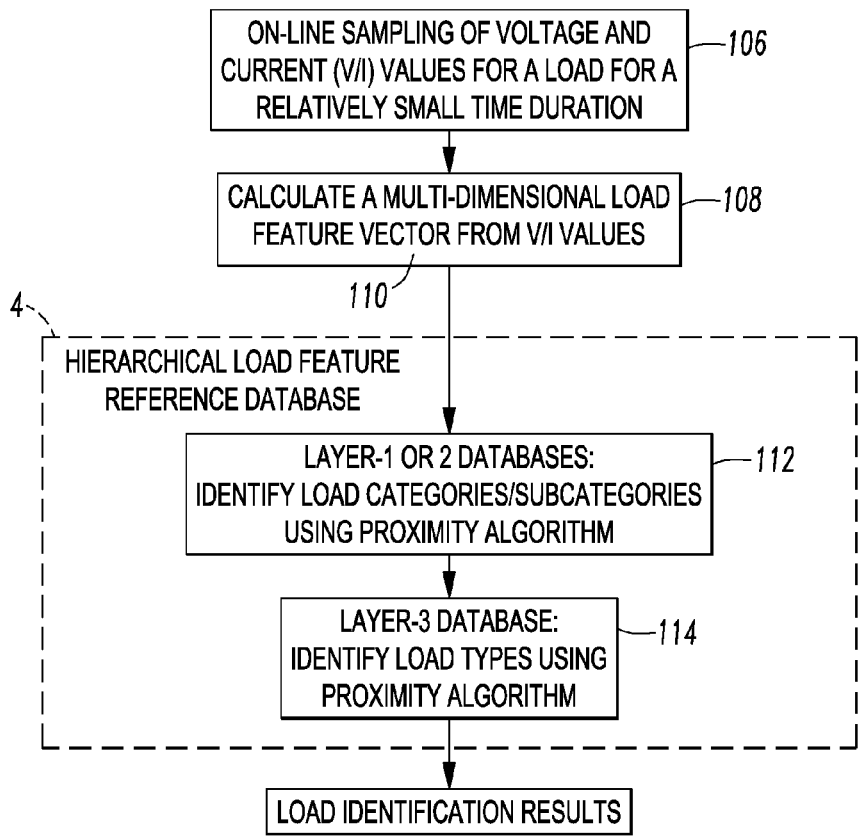
FIG. 10 is a flowchart of a proximity-based algorithm for identification of electric loads in accordance with embodiments of the disclosed concept.

Referring to FIG. 10, the disclosed concept provides a proximity algorithm based MELs identification system. This includes on-line sampling 106 of voltage and current values for a load for a relatively small time duration (e.g., without limitation, one second; any suitable time), calculating 108 a suitable multi-dimensional load feature vector 110 from the V/I values of the on-line sampling 106, identifying 112 the load category and/or subcategory using the disclosed proximity algorithm and a suitable load feature reference database (e.g., without limitation, layers 6 or 8 of the example database 4 of FIG. 2), and identifying 114 the load type (and/or its operating state) using the disclosed proximity algorithm and a suitable load feature reference database (e.g., without limitation, layer 10 of the example database 4 of FIG. 2). It will be appreciated that one or both of steps 112 and 114 can be employed.

A method of identifying electric load types of a plurality of different electric loads 22,24,26,28 (FIG. 1) includes providing the load feature database 4 of a plurality of the different electric load types 12 (FIG. 2), each of the electric load types including a first load feature vector having at least four different load features; sensing, at 106, a voltage signal 20 (FIG. 1) and a current signal 18 (FIG. 1) for each of the different electric loads 22,24,26,28 for a relatively small time duration (e.g., without limitation, one second; any suitable time duration); determining, at 108, the second load feature vector 110 comprising at least four different load features from the sensed second voltage signal 20 and the sensed current signal 18 for a corresponding one of the different electric loads; and identifying, at 114, by the processor 30 (FIG. 1) one of the different electric load types 12 by determining a minimum distance of the second load feature vector 110 with respect to the first load feature vector of the different electric load types 12 of the load feature database 4.

The load feature extraction, at 108, and construction of the database 4 investigate different load features (e.g., signatures) of MELs. This extracts from the actual operational sensed current and sensed voltage of electric loads the following aspects of different load characteristics: (1) steady state current waveform and power quality related quantities; (2) voltage-current trajectory graphical representation under start-up and steady-state conditions; (3) transient state characteristics of load current, including short-term harmonic contents, and transient power contents; (4) load event detection, operating status profile, and operating modes patterns.

A suitable multi-dimensional load feature reference database, such as the example database 4, is then constructed, and is used to store the load feature vectors for all MELs under study. Each load feature vector (or a cluster of the load feature vectors) represents uniquely one type of load. After the load feature reference database 4 is constructed, the test load can be identified using the disclosed proximity algorithm.

The disclosed proximity algorithm for identification is as follows. First, given a target load, its electrical load feature (e.g., signature) vector is generated. Then, distances for a selected set of load features are calculated between the test load and the applicable reference database loads. The likelihood of each possible load type is inversely proportional to the calculated distance between the test load and the database load types 12 (FIG. 2).

Figure 11:
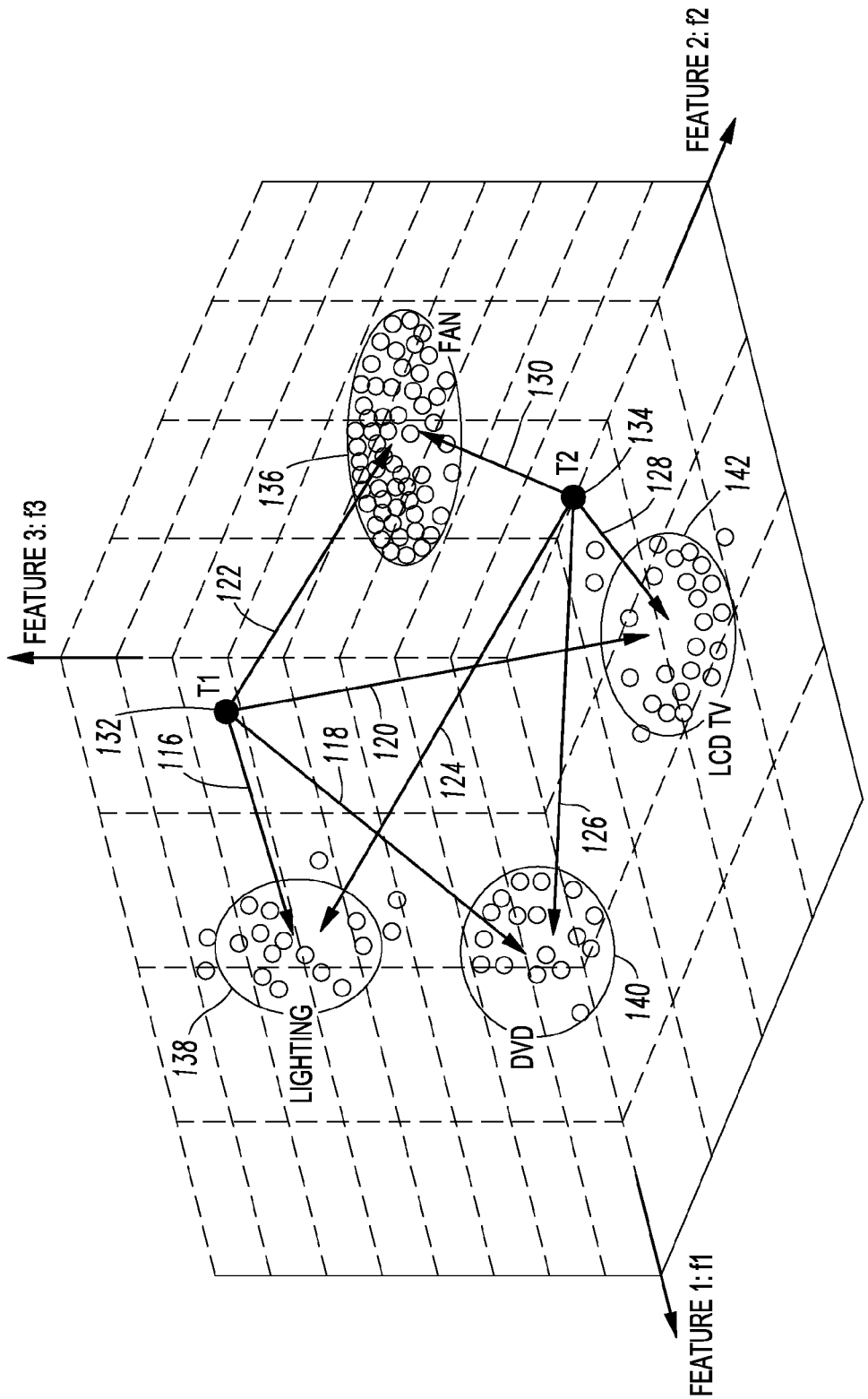
FIG. 11 is a plot of two test loads and four reference databases, showing distances therebetween, in accordance with embodiments of the disclosed concept.
Figure 12A:
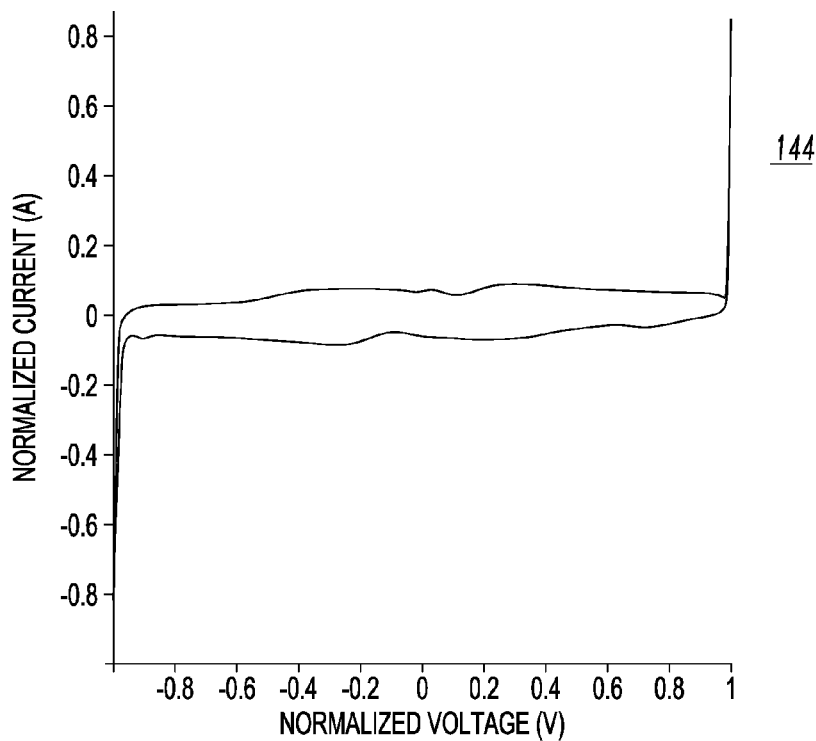
FIGS. 12A-12B are plots of a V-I trajectory and mean line of a printer.
Figure 12B:
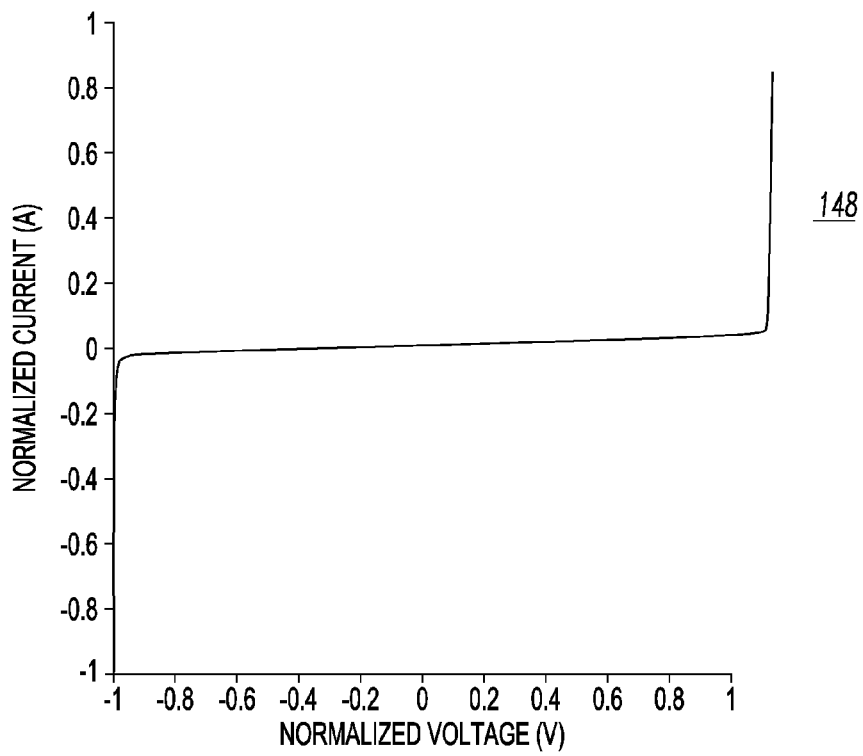
Figure 13A:
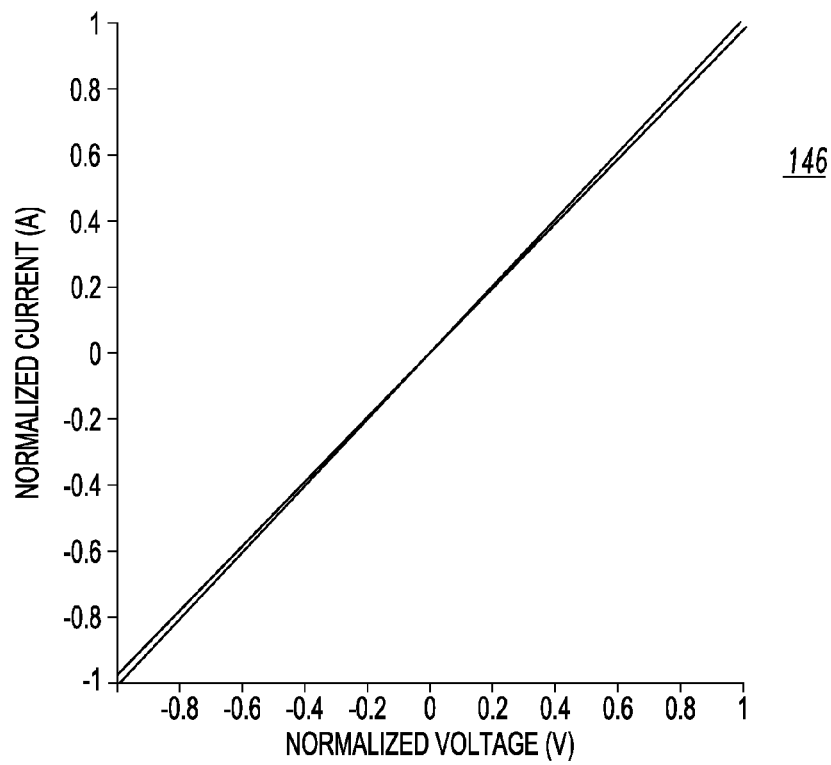
FIGS. 13A-13B are plots of a V-I trajectory and mean line of an incandescent lamp.
Figure 13B:
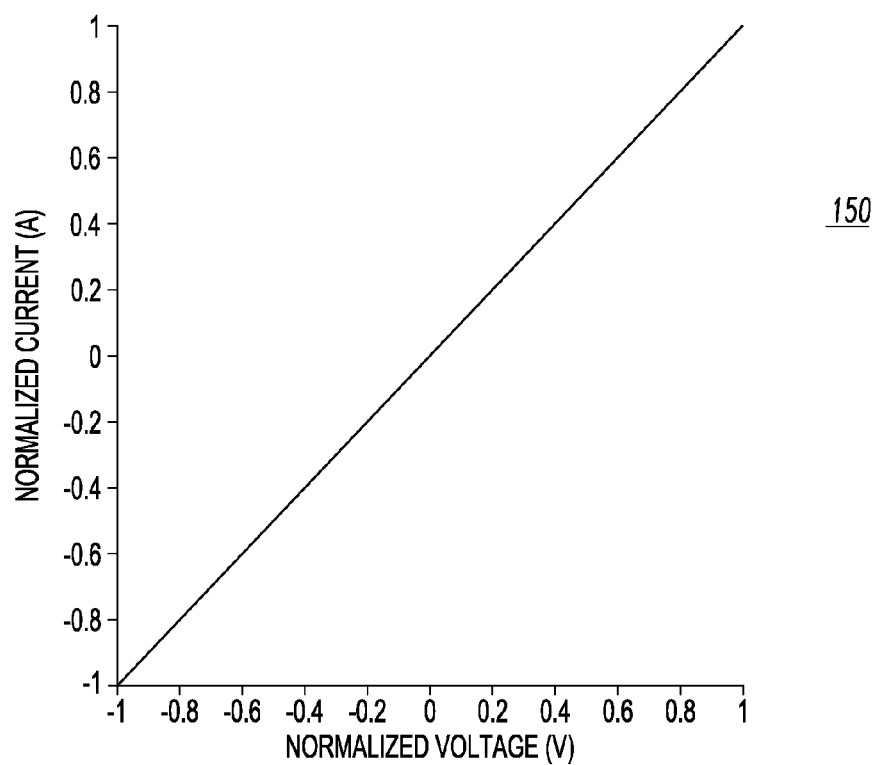

FIG. 11 shows distances 116,118,120,122 and 124,126,128,130 between two example test loads (T1,T2) 132,134 and four example reference databases 136,138,140,142, wherein:
T1 is the first test load 132 with N load features;
T2 is the second test load 134 with N load features;
Fan is the reference database 136 for fan loads;
Lighting is the reference database 138 for lighting loads;
DVD is the reference database 140 for DVD loads; and
LCD is the reference database 142 for LCD television loads.

In this example, only three example load features (f1, f2 and f3) are considered just for the convenience of illustration in three dimensions, although four or more load features can be employed. Based on the distances 116,118,120,122 and 124,126,128,130, the disclosed proximity algorithm gives relatively larger likelihood numbers for the lighting type of load for test load T1 132 and the LCD television type of load for test load T2 134.

A more strict description of the disclosed proximity algorithm is as follows. The selected load features of the test load are denoted as $f_1, f_2, \ldots, f_n$. The probability ($Pm_i$) of a test load, such as example test load 132 or 134, being the reference $i^{th}$ load of the example database 4 is given by Equation 7.

$$Pm_i = \max\left[\left(\frac{1}{\delta + D_{ik}}\right)_{k=1,\ldots,K}\right] \quad \text{(Eq. 7)}$$

wherein:

$D_{ik}$ is distance between (a) load features of the load feature vectors of the reference database 4 and (b) load features of the load feature vector of a test load;

n is at least four;

N is number of different load features;

K is number of records in the reference database 4 per 'i' load type;

δ is a constant value (e.g., a relatively very small number to avoid the denominator being zero and, thus, getting a divide by zero error);

k is an index representing the database record; and i is an index representing the load type.

The physical implication of Equation 7 is that the associated likelihood that the test load is of load type i is proportional to the sum of the reciprocal of the distance between (a) load features of the load feature vectors of the reference database 4 and (b) the load features of the load feature vector of the test load.

The likelihood ($L_i$) of the test load being the $i^{th}$ load type is given by Equation 8.

$$L_i = \frac{Pm_i}{\sum_{i=1}^{I} Pm_i} \quad \text{(Eq. 8)}$$

wherein:

I is total number of load types in the reference database 4.

Equation 8 guarantees that the sum of the likelihood numbers for all of the possible load types in the reference database 4 is 1.

There are many distance metrics that can be applied to the above algorithm depicted in Equations 7 and 8 (e.g., without limitation, squared Euclidean distance; Canberra distance; Mahalanobis distance). The details are given as follows.

Squared Euclidean distance:

$$D_{ik} = \left(\sum_{n=1}^{N} \frac{(f_n - f_{kn})^2}{f_n^2}\right)^2$$

wherein:

$f_{kn}$ is one of the load features of the $k^{th}$ record in the reference database 4 corresponding to the load feature vector parameter, $f_n$, of the test load.

Canberra Distance:

Canberra distance examines the sum of series of fractional differences between a pair of objects, given by:

$$D_{ik} = \left(\sum_{n=1}^{N} \frac{|f_n - f_{kn}|}{|f_n| + |f_{kn}|}\right).$$

Mahalonobis Distance:

Mahalonobis distance examines the dissimilarity measure between two random vectors of the same distribution with covariance matrix $\Sigma$:

$$D_{ik} = \sqrt{(\vec{f} - \vec{f}_k)\Sigma^{-1}(\vec{f} - \vec{f}_k)}$$

wherein:

$\vec{f} = [f_1, \ldots f_n]$ is the first load feature vector of the test load; and $\vec{f}_k = [f_{k1}, \ldots f_{kn}]$ is the second load feature vector as the $k^{th}$ record in the reference database 4.

The following are examples for Equations 7 and 8 to demonstrate how the disclosed proximity algorithm evaluates the load type of a test load and the likelihood of the test load being the $i^{th}$ load type of the database 4 based on the squared Euclidean distance metric.

Example 1

A non-limiting example load set includes: (1) a cell phone charger; (2) a DVD player; (3) a fan; (4) an LCD television; (5) a fluorescent lamp; and (6) a resistive lamp.

The following (N=8) different load features are employed: (f1) current crest factor; (f2) current THD; (f3) K-factor; (f4) area; (f5) polynomial coefficient #1; (f6) polynomial coefficient #2; (f7) polynomial coefficient #3; and (f8) polynomial coefficient #4. The example reference database 4 is made up of these example eight load features for the example six different load types, and the example number of records for each load type is K=30.

Table 7 shows one reference data record for a resistive lamp as an example.

TABLE 7

| Current Crest Factor | 127.39 |
| --- | --- |
| Current THD | 3.2587 |
| K-factor | 25.051 |
| Area | −0.2397 |
| Polynomial Coefficient #1 | 0.6357 |
| Polynomial Coefficient #2 | 0.0011 |
| Polynomial Coefficient #3 | −0.2148 |
| Polynomial Coefficient #4 | −0.0032 |

If a resistive lamp, such as an incandescent bulb, is the test load, then an example of the test data record is shown in Table 8.

TABLE 8

| Current Crest Factor | 1.4102 |
| --- | --- |
| Current THD | 1.2502 |
| K-factor | 1.0070 |
| Area | −0.048 |
| Polynomial Coefficient #1 | −0.0239 |
| Polynomial Coefficient #2 | 0.0033 |
| Polynomial Coefficient #3 | 1.0231 |
| Polynomial Coefficient #4 | −0.0032 |

To evaluate the probability of the test load being the $i^{th}$ load of the database 4, the squared Euclidean distance between the reference data record (Table 7) and the test data record (Table 8) is calculated for each of the load features of interest. Taking one load feature, f1: current crest factor, as an example, the distance between f1 (current crest factor=127.39) of reference data record and f1 (current crest factor=1.4102) of the test data record is calculated as:

Squared Euclidean Distance$_{f1}$=7980.69

Similarly, the squared Euclidean distances are calculated for all of the other example load features (f2 through f8). The distance between the reference data record and the test record is the summation of all of these distances. Then, the probability is calculated as the reciprocal of final summation per Equation 7.

Table 9 shows the probability (Pm$_i$) of the test incandescent bulb for each of the six (i=6) example reference load types.

TABLE 9

| Load Type | Probability |
| --- | --- |
| Cell Phone Charger | 8.73E−05 |
| DVD Player | 4.15E−05 |
| Fan | 0.000766 |
| LCD Television | 0.001339 |
| Fluorescent Lamp | 6.51E−05 |
| Resistive (Incandescent) Lamp | 2006.232 |

The probability (Pm$_i$) of the test incandescent bulb being a resistive lamp is 2006.232, which is the highest among all of the six example reference load types. The summation of all these probabilities is $\Sigma$Pm$_i$=2006.233, and the likelihood (L$_i$) of the test load being the resistive lamp load type (from Equation 8) is equal to 2006.232/2006.233*100=99.99995%.

Table 10 shows the likelihood (L$_i$) of the test incandescent bulb being each of the six example reference load types.

TABLE 10

| Load Type | Likelihood (%) |
| --- | --- |
| Cell Phone Charger | 4.35E−06 |
| DVD Player | 2.07E−06 |
| Fan | 3.82E−05 |
| LCD Television | 6.67E−05 |
| Fluorescent Lamp | 3.24E−06 |
| Resistive (Incandescent) Lamp | 99.99995 |

In this example, the test load is, therefore, identified as being the resistive lamp with the likelihood value of 99.99995%.

Example 2

Using the eight example load features (f1 through f8) as were discussed above with Example 1, a reference database is constructed, for example and without limitation, including 30 different load types as shown in Table 11, which includes the test load type, the identified load type, and the likelihood percentage. The disclosed proximity algorithm is employed to identify the load type (employing Equation 7) of the test load and to calculate the likelihood of the test load being its reference load type (employing Equation 8).

The correct load identification percentage, or the load identification successful rate, for the different load types is also evaluated, and the results are shown in Table 12.

TABLE 11

| Test Load Type | Identified Load Type | Likelihood (%) |
|---|---|---|
| Cell Phone Charger | Cell Phone Charger | 93.01 |
| DVD Player | DVD Player | 99.32 |
| Desktop Computer | Desktop Computer | 96.90 |
| Fan | Fan | 99.33 |
| LCD Monitor | LCD Monitor | 81.76 |
| LCD Television | LCD Television | 92.41 |
| LED Television | LED Television | 99.68 |
| Laptop Adapter | Laptop Adapter | 76.46 |
| Microwave | Microwave | 99.95 |
| Plasma Television | Plasma Television | 80.36 |
| Set Top Box | Set Top Box | 97.65 |
| Space Heater | Space Heater | 98.37 |
| Portable Hard Drive | Portable Hard Drive | 80.92 |
| Printer | Printer | 49.67 |
| Projector | Projector | 91.73 |
| Scanner | Scanner | 97.75 |
| Stapler | Stapler | 64.80 |
| USB Hub | USB Hub | 97.59 |
| Multifunction Device | Multifunction Device | 72.11 |
| Battery Charger | Battery Charger | 56.92 |
| Bread Toaster | Bread Toaster | 98.62 |
| Camera | Camera | 91.90 |
| Coffee Maker | Coffee Maker | 91.05 |
| Electronic Print Board | Electronic Print Board | 86.86 |
| Refrigerator | Refrigerator | 68.30 |
| Shredder | Shredder | 99.99 |
| Vending Machine | Vending Machine | 99.65 |
| Fluorescent Light | Fluorescent Light | 77.53 |
| LED Light | LED Light | 90.28 |
| Resistive Light | Resistive Light | 99.99 |

TABLE 12

| Load Type | Load Identification Percentage (%) |
|---|---|
| Cell Phone Charger | 85.97560976 |
| DVD Player | 92.5257732 |
| Desktop Computer | 96.1038961 |
| Fan | 98.97172237 |
| LCD Monitor | 88.03418803 |
| LCD Television | 96.59442724 |
| LED Television | 92.1875 |
| Laptop Adapter | 88.88888889 |
| Microwave | 99.71988796 |
| Plasma Television | 97.05882353 |
| Set Top Box | 97.77777778 |
| Space Heater | 99.30555556 |
| Portable Hard Drive | 84.61538462 |
| Printer | 100 |
| Projector | 96.42857143 |
| Scanner | 100 |
| Stapler | 80 |
| USB Hub | 100 |
| Multifunction Device | 71.66666667 |
| Battery Charger | 100 |
| Bread Toaster | 100 |
| Camera | 60 |
| Coffee Maker | 66.66666667 |
| Electronic Print Board | 92.85714286 |
| Refrigerator | 100 |
| Shredder | 100 |
| Vending Machine | 92.30769231 |
| Fluorescent Light | 100 |
| LED Light | 95 |
| Resistive Light | 100 |

Example 3

Other non-limiting examples of load features for MELs include: (1) current crest factor; (2) current total harmonic distortion (THD); (3) K-factor; (4) distortion power factor; (5) true power factor; (6) normalized I3; (7) area; (8) eccentricity; (9) thinness; (10) slope of middle segment; (11) polynomial coefficients; and (12) normalized admittance.

Normalized I3 ($I_{3norm}$) is the normalized value of the $3^{rd}$ order current harmonic component ($I_3$=the RMS value of the $3^{rd}$ order current harmonic component) divided by the fundamental current component ($I_1$=the RMS value of the fundamental current component), given by $I_{3norm}=I_3/I_1$. The slope of middle segment refers to the slope of the middle segment of a mean line of a V-I trajectory. The individual segments in a V-I trajectory can be determined by knowing bending points in a trajectory. FIGS. 12A-12B and 13A-13B show two examples of V-I trajectory 144,146 and mean line 148,150 of a printer and an incandescent lamp, respectively.

Admittance is preferable to power P and current as a load feature since it is a voltage independent property, and can be calculated from the measured power, P, and voltage RMS, $V_{RMS}$, as admittance=$P/V_{RMS}^2$. Admittance is adjusted by a constant scale factor resulting in admittance normalized to nominal voltage, or normalized admittance=$(V_{NOMINAL}/V_{RMS})^2 *P$, where $V_{NOMINAL}$ is nominal voltage (e.g., 120 VAC in North America; 230 VAC in Asia and Europe), $V_{RMS}$ is the measured RMS voltage of the load, and P is the measured power of the load. This feature can also be referred as the "normalized power" with more straightforward engineering intuition when considering values and units.

The disclosed concept provides a proximity-based algorithm to classify and/or identify loads used in, for example and without limitation, residential, commercial and industrial applications. The disclosed proximity algorithm is based on nearest proximity of load features in a suitable multi-dimensional space. This can identify the category of the load, the load type and/or the load operational state in a non-intrusive manner. The disclosed proximity algorithm can also be employed to calculate the likelihood of a test load being one of the load types from the reference database 4.

It is believed that through suitable selection of the load features for the multi-dimensional load feature vector 110 and/or assignment of weightings to those load features that, for example, the percentages in Tables 11 and 12 are increased. For example and without limitation, it is desired that all of the likelihood percentages in Table 11 would exceed a predetermined value (e.g., without limitation, 75%). For example, the term $(f_n-f_{kn})^2$ of Equation 7 could be replaced by $w_n(f_n-f_{kn})^2$, wherein $w_n$ is a predetermined weight value corresponding to load feature $f_n$.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of identifying electric load types of a plurality of different electric loads, said method comprising:
   providing a load feature database of a plurality of different electric load types, each of the different electric load types including a first load feature vector having at least four different load features;
   sensing a voltage signal and a current signal for each of said different electric loads;
   determining a second load feature vector comprising at least four different load features from said sensed voltage signal and said sensed current signal for a corresponding one of said different electric loads;
   identifying by a processor one of said different electric load types by determining a minimum distance of said second load feature vector to the first load feature vector of said different electric load types of said load feature database;
   employing i and k as indices;
   employing K as a count of records in said load feature database as indexed by k;
   employing $\delta$ as a constant value;
   employing $D_{ik}$ as distance between the second load feature vector and the first load feature vector and as the $k^{th}$ record in the load feature database; and
   determining probability of the corresponding one of said different electric loads being the $i^{th}$ one of the different electric load types of said load feature database from:

$$Pm_i = \max\left[\left(\frac{1}{\delta + D_{ik}}\right)_{k=1,\ldots,K}\right].$$

2. The method of claim 1 further comprising:
   employing I as a count of said different electric load types in said load feature database; and
   determining likelihood of said corresponding one of said different electric loads being the $i^{th}$ one of the different electric load types from:

$$L_i = \frac{Pm_i}{\sum_{i=1}^{I} Pm_i}.$$

3. A method of identifying electric load types of a plurality of different electric loads, said method comprising:
   providing a load feature database of a plurality of different electric load types, each of the different electric load types including a first load feature vector having at least four different load features;
   sensing a voltage signal and a current signal for each of said different electric loads;
   determining a second load feature vector comprising at least four different load features from said sensed voltage signal and said sensed current signal for a corresponding one of said different electric loads;
   identifying by a processor one of said different electric load types by determining a minimum distance of said second load feature vector to the first load feature vector of said different electric load types of said load feature database;
   calculating distances for each of said at least four different load features between the second load feature vector of the corresponding one of said different electric loads and the first load feature vector of each of said different electric load types in said load feature database;
   for each of said different electric load types, summing said calculated distances for the corresponding one of said different electric loads;
   identifying said one of said different electric load types from a minimum value of said summed calculated distances for each of said different electric load types; and
   determining a likelihood estimation of load type that is equal to a ratio of (a) to (b), wherein (a) is how likely the corresponding one of said different electric loads is said one of said different electric load types and (b) is a sum of how likely the corresponding one of said different electric loads is a corresponding one of said different electric load types for each of said different electric load types.

4. The method of claim 3 further comprising:
   including with said load feature database a plurality of load characteristics selected from the group consisting of steady state current waveform and power quality related quantities, voltage-current trajectory graphical representation under start-up and steady-state conditions, transient state characteristics of load current, and load event detection, operating status profile, and operating modes patterns.

5. The method of claim 3 further comprising:
   including with said first and second load feature vectors said different load features selected from the group consisting of: current crest factor, current total harmonic distortion, K-factor, distortion power factor, true power factor, area, eccentricity, thinness, slope of middle segment, polynomial coefficients, and normalized admittance.

6. The method of claim 3 further comprising:
   including with said different electric load types a category of an electrical load, a type of the electrical load, and an operational state of the electrical load.

7. The method of claim 3 further comprising:
   employing at least eight different load features as said at least four different load features of said first and second load feature vectors.

8. The method of claim 3 further comprising:
   calculating said distances selected from the group consisting of squared Euclidean distances, Canberra distances, and Mahalanobis distances.

9. A method of identifying electric load types of a plurality of different electric loads, said method comprising:
   providing a load feature database of a plurality of different electric load types, each of the different electric load types including a first load feature vector having at least four different load features;
   sensing a voltage signal and a current signal for each of said different electric loads;
   determining a second load feature vector comprising at least four different load features from said sensed voltage signal and said sensed current signal for a corresponding one of said different electric loads;
   identifying by a processor one of said different electric load types by determining a minimum distance of said second load feature vector to the first load feature vector of said different electric load types of said load feature database;
   calculating distances for each of said at least four different load features between the second load feature vector of the corresponding one of said different electric loads and the first load feature vector of each of said different electric load types in said load feature database;

for each of said different electric load types, summing said calculated distances for the corresponding one of said different electric loads;

identifying said one of said different electric load types from a minimum value of said summed calculated distances for each of said different electric load types;

identifying how likely the corresponding one of said different electric loads is said one of said different electric load types; and assigning a predetermined weighting value to a corresponding one of said different load features of the first and second load feature vectors when calculating each of said calculated distances.

10. A method of identifying electric load types of a plurality of different electric loads, said method comprising:

providing a load feature database of a plurality of different electric load types, each of the different electric load types including a first load feature vector having at least four different load features;

sensing a voltage signal and a current signal for each of said different electric loads;

determining a second load feature vector comprising at least four different load features from said sensed voltage signal and said sensed current signal for a corresponding one of said different electric loads;

identifying by a processor one of said different electric load types by determining a minimum distance of said second load feature vector to the first load feature vector of said different electric load types of said load feature database;

wherein said identifying by a processor one of said different electric load types comprises identifying by said processor a load category, a load sub-category and said one of said different electric load types using a three-layer architecture by:

(i) providing as said load feature database a hierarchical load feature database comprising three layers;

(ii) employing a first load feature set of a first one of said layers; and (iii) employing a second different load feature set of a second one and a third one of said layers;

the method further comprising employing a plurality of load categories for the first one of said layers;

employing a plurality of load sub-categories for the second one of said layers; and employing said plurality of different electric load types for the third one of said layers.

11. A system comprising:

a load feature database of a plurality of different electric load types, each of the different electric load types including a first load feature vector having at least four different load features;

a plurality of sensors structured to sense a voltage signal and a current signal for each of a plurality of different electric loads; and a processor structured to:

determine a second load feature vector comprising at least four different load features from said sensed voltage signal and said sensed current signal for a corresponding one of said different electric loads, and identify one of said different electric load types by determining a minimum distance of said second load feature vector to the first load feature vector of said different electric load types of said load feature database, wherein i and k are indices; wherein K is a count of records in said load feature database as indexed by k; where $\delta$ is a constant value; wherein $D_{ik}$ is distance between the second load feature vector and the first load feature vector and is the $k^{th}$ record in the load feature database; and wherein said processor is further structured to determine probability of the corresponding one of said different electric loads being the $i^{th}$ one of the different electric load types of said load feature database from:

$$Pm_i = \max\left[\left(\frac{1}{\delta + D_{ik}}\right)_{k=1,\ldots,K}\right].$$

12. The system of claim 11 wherein I is a count of said different electric load types in said load feature database; and wherein said processor is further structured to determine likelihood of said corresponding one of said different electric loads being the $i^{th}$ one of the different electric load types from:

$$L_i = \frac{Pm_i}{\sum_{i=1}^{I} Pm_i}.$$

13. The system of claim 11 wherein said first and second load feature vectors include said different load features selected from the group consisting of: current crest factor, current total harmonic distortion, K-factor, distortion power factor, true power factor, area, eccentricity, thinness, slope of middle segment, polynomial coefficients, and normalized admittance.

14. The system of claim 11 wherein said different electric load types include a category of an electrical load, a type of the electrical load, and an operational state of the electrical load.

15. The system of claim 11 wherein said at least four different load features are at least eight different load features of said first and second load feature vectors.

16. A system comprising:

a load feature database of a plurality of different electric load types, each of the different electric load types including a first load feature vector having at least four different load features;

a plurality of sensors structured to sense a voltage signal and a current signal for each of a plurality of different electric loads; and a processor structured to:

determine a second load feature vector comprising at least four different load features from said sensed voltage signal and said sensed current signal for a corresponding one of said different electric loads, and identify one of said different electric load types by determining a minimum distance of said second load feature vector to the first load feature vector of said different electric load types of said load feature database, wherein said processor is further structured to calculate distances for each of said at least four different load features between the second load feature vector of the corresponding one of said different electric loads and the first load feature vector of each of said different electric load types in said load feature database; to sum, for each of said different electric load types, said calculated distances for the corresponding one of said different electric loads; to identify said one of said different electric load types from a minimum value of said summed calculated distances for each of said different electric load types; and wherein said processor is further structured to determine a likelihood estimation of load type that is equal to a ratio of (a) to (b), wherein (a) is how likely the corresponding one of said different electric loads is said one of said different electric load types and (b) is a sum of how likely the corresponding one of said different electric loads is a corresponding one of said different electric load types for each of said different electric load types.

\* \* \* \* \*